United States Patent [19]

Wochnowski

[11] 3,777,258

[45] Dec. 4, 1973

[54] METHOD AND ARRANGEMENT FOR MEASURING THE QUANTITY OF MOISTURE IN SMOKING GOODS

[75] Inventor: Waldemar Wochnowski, Hamburg, Germany

[73] Assignee: Hauni-Werke Körber & Co. KG, Hamburg, Germany

[22] Filed: Sept. 13, 1972

[21] Appl. No.: 288,665

[30] Foreign Application Priority Data

Sept. 16, 1971 Germany.................. P 21 46 386.5

[52] U.S. Cl............................. 324/61 QS, 131/135
[51] Int. Cl............................................. G01r 27/26
[58] Field of Search..................... 324/61 QS, 61 R; 131/135, 136

[56] References Cited
UNITED STATES PATENTS

| | | | |
|---|---|---|---|
| 2,529,846 | 11/1950 | McBrayer et al. | 324/61 QS |
| 3,046,479 | 7/1962 | Mead et al. | 324/61 R |
| 3,320,528 | 5/1967 | Esenwein | 324/61 R |
| 3,482,162 | 12/1969 | Wochnowski | 324/61 R |
| 3,496,255 | 2/1970 | Erxleben et al. | 131/136 X |

Primary Examiner—Stanley T. Krawczewicz
Attorney—Michael S. Striker

[57] ABSTRACT

Tobacco moving along a conveyor belt is compressed with a force several times the force of the dead weight of the tobacco. The compressed tobacco has an electric field applied through a first and second electrode positioned on the same side thereof. The electrodes constitute a capacitor which is part of a tuned circuit and under resonance conditions the signal derived from the tuned circuit has a magnitude corresponding to the percentage of moisture in the tobacco.

16 Claims, 7 Drawing Figures

METHOD AND ARRANGEMENT FOR MEASURING THE QUANTITY OF MOISTURE IN SMOKING GOODS

BACKGROUND OF THE INVENTION

This invention relates to a method and arrangement for determining the moisture content in tobacco or similar smoking goods. In particular it relates to such arrangements wherein the lines of force of a high-frequency electrical field are applied to the smoking goods by means of a tuned circuit whose frequency is controlled. In these arrangements, when the tuned circuit is at resonance, with the high-frequency oscillator supplying energy thereto, a signal is generated in a measuring circuit whose amplitude varies as a function of the moisture content of the smoking goods.

The above method and arrangement for determining moisture content in tobacco is described, for example, in one embodiment in German Pat. No. 935,380. In practice, it has the disadvantage that the amplitude of the measuring signal depends not only on the moisture content but also on the mass of the tobacco being measured. An arrangement is known for eliminating for this dependence on tobacco mass. This known arrangement comprises a chute which has a particular measuring channel which extends in direction of transport of the tobacco. This measuring channel is V-shaped and is so arranged within the chute that approximately the same quantity of tobacco is always found therein. Of course it must be assumed that the amount of tobacco furnished to the chute is at least as great as the capacity of the measuring channel. For quantities of tobacco exceeding the capacity of the measuring channel, the excess tobacco is spilled into the parts of the chute which lie underneath the measuring channel. In the sides of the V-shaped measuring channel electrodes are arranged which together comprise a measuring capacitor for the tuned circuit. The electrodes are so arranged that the set of electrodes guiding the lines of electric force into the tobacco are arranged in one leg of the V, while the electrodes guiding the lines of force from the tobacco are arranged in the other leg of the V. Thus the electric lines of forces penetrate through the tobacco.

While the above-described arrangement has been found to operate very successfully in practice, it has the disadvantage that the characteristic curves of moisture content plotted against the value of the electrical measurement signal are not linear. A further problem is that tobacco in particular states, for instance whole tobacco leaves, cannot be successfully subjected to a moisture measurement.

SUMMARY OF THE INVENTION

It is an object of the present invention to furnish an arrangement wherein the moisture content of tobacco in any desired state may be successfully measured.

It is a further object of the present invention to provide a system and method whereby the characteristic of moisture content versus measurement signal are substantially linear.

In the method and arrangement of the present invention tobacco is transported past a measuring station. At said measuring station, the tobacco is pressed with a force substantially exceeding the weight thereof. A high-frequency oscillator means supplies a high-frequency electrical signal to tuned circuit means, the tuned circuit means having a first and second electrode arranged on the same side of the tobacco for transmitting lines of electrical force into and out of said tobacco. The frequency of the tuned circuit is controlled in such a manner that it is in resonance with the high-frequency oscillator means supplying energy thereto. The measurement circuit measures a signal in the tuned circuit whose amplitude varies as a function of the smoking goods.

In the above-described arrangement the smoking goods (tobacco) can be in the form of shredded tobacco, as is required for cigarette production. However, it can also be in the form of small tobacco pieces as is required for the manufacture of cigars. Finally, it is even possible to measure reconstituted tobacco sheets to determine the moisture content thereof. Of course, if the tobacco is available in relatively thin broad sheets in which it is manufactured, and not in the form of coarsely comminuted tobacco leaves or finely comminuted tobacco leaves, as mentioned above, then the pressing of the tobacco is not required. The pressing process has the main purpose of eliminating variations in the output signal resulting from mass variations in the tobacco. The method and arrangement of the present invention is of course also usable for measuring the moisture content in tobacco substitutes which have a physical consistency similar to that of tobacco. It is therefore in general applicable to smoking goods of any type.

If the smoking goods have relatively small zones whose moisture varies greatly from the moisture content of the remaining portions of the tobacco, the influence of such relatively small zones onto the measuring signal can be decreased by a particularly preferred embodiment of the present invention. In this embodiment, the first and second electrodes each comprise a plurality of electrode elements. The lines of force enter the tobacco through the electrode elements comprising the first electrode means and the lines of force leave the tobacco through the electrode elements comprised in the second electrode means. This type of electrode arrangement is particularly advantageous when the tobacco, as is customary in modern production plants, is to have its moisture content measured while being transported along a predetermined path. The relatively short but large variations in the instantaneous value of the moisture content are suppressed by this electrode arrangement.

In a further preferred embodiment of the present invention, the resonant frequency of the tuned circuit is changed periodically over a predetermined frequency range. This frequency range includes the frequency at which the circuit is in resonance with the signal applied thereto. The amplitude of the signal derived from the tuned circuit at resonance varies as a function of the moisture content of the tobacco. The electrical signal derived from the tuned circuit is preferably a voltage. Of course the amplitude of the current in the tuned circuit may also be used as a measurement signal.

It should further be noted that of course filter material may also be subjected to the moisture measurement in accordance with the present invention and is to be included in the term "smoking goods."

In a preferred embodiment of the present invention the plurality of electrode elements constituting the first and second electrode means are arranged in a plane. In the arrangement, each first electrode element is followed by a second electrode element in space.

This arrangement of the electrode means, wherein the plurality of first electrode elements is arranged in pairs with the plurality of second electrode elements is particularly useful for measuring the moisture content of thin sheets of tobacco which, as mentioned above, do not require the pressing operation.

In modern tobacco-processing plants, each measuring and pressing of the tobacco is preferably undertaken during uninterrupted transport of said tobacco. The moisture content measuring method and arrangement of the present invention can be carried out without interrupting this transport of tobacco. Thus the support means may comprise the tobacco-transport means which may be an endless conveyor belt. The pressing of the tobacco may also be accomplished while the tobacco is being transported. This is accomplished by use of a press conveyor. In order that the press conveyor may be readily adaptable to various quantities of tobacco being transported past it, it is movably mounted in the direction away from and towards the conveyor belt carrying the tobacco.

In a preferred embodiment of the present invention the tuned circuit has means for periodically varying the resonant frequency thereof, in such a manner that the tuned circuit is in resonance at least once during each frequency change. A voltage in the tuned circuit is then applied to a measuring means which furnishes a signal whose output varies as a function of moisture content of the smoking goods when the tuned circuit is in resonance.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
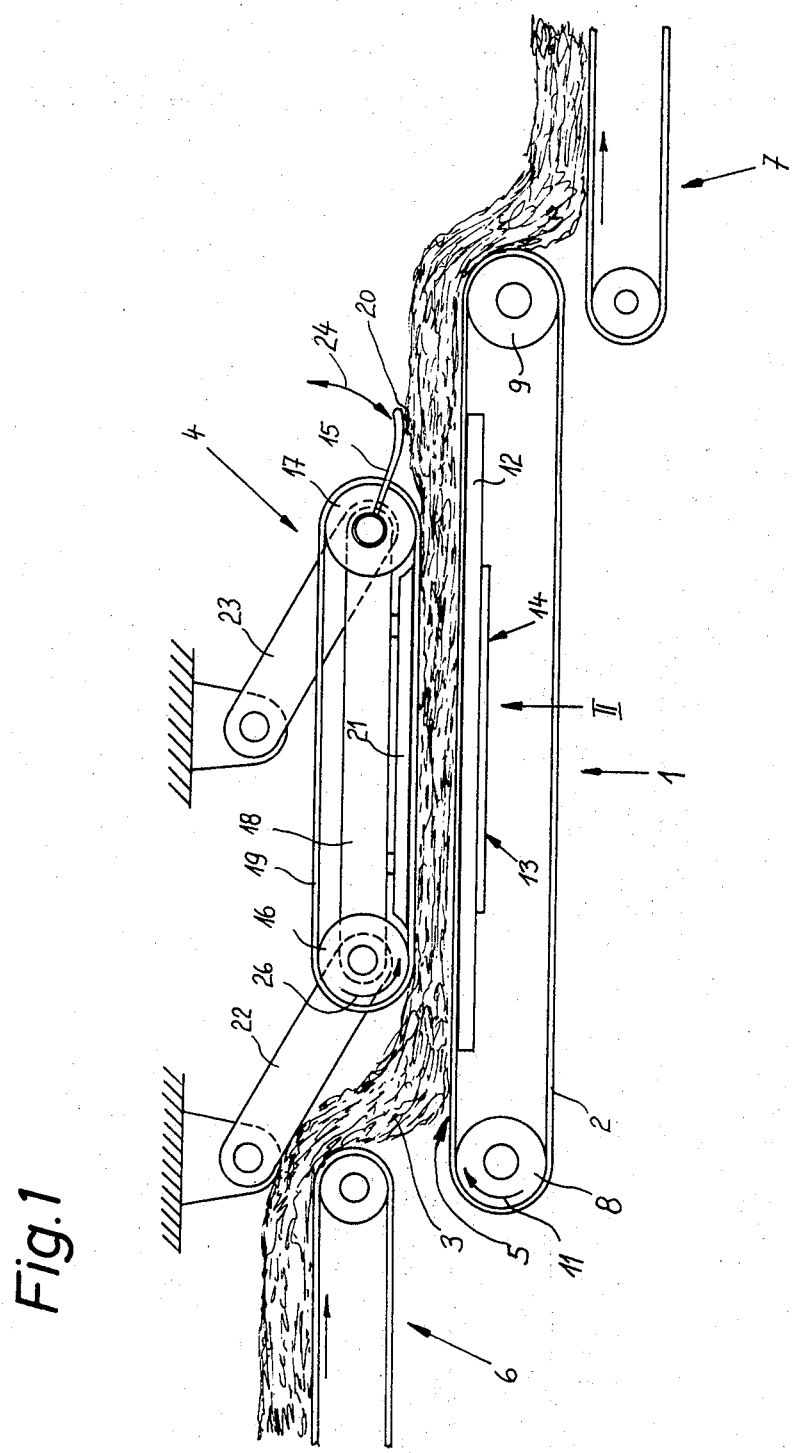
FIG. 1 shows an arrangement for measuring the moisture content of smoking goods in a side view.

A preferred embodiment of the present invention will now be described with reference to the drawing.

The arrangement for furnishing a measurement signal which is the subject of the present invention is shown in FIG. 1 as comprising support means, 1, which include an endless conveyor belt 2 for transporting the tobacco 3. It further comprises press conveyor means 4 located above the tobacco 3 and constituting pressing means for said tobacco. Further shown are supply means which supply the tobacco to the arrangement, reference numeral 6, and means for transporting the tobacco away from the measuring station, 7. The conveyor belt 2 forms one surface of the tobacco 3 and is looped around rollers 8 and 9, roller 8 being driven in the direction of arrow 11. The upper surface of conveyor belt 2 is passed over an isolating plate 12 which has good high-frequency characteristics and to whose lower surface electrodes 13 and 14 (for details FIG. 2) are mounted. The isolating plate 12 also serves as a plate against which the tobacco is being pressed by a press conveyor 4. Press conveyor 4 in turn has rollers 16 and 17 which are mounted on a carrier 18 around which a conveyor belt 19 is mounted. The lower side of conveyor belt 19 passes over a reinforcing plate 21 which is fastened to carrier means 18. Press conveyor 4 has linkages 22 and 23 which mount it pivotably in the direction of double arrow 24. The weight of the press conveyor 4 is used for compressing the tobacco which is between the press conveyor and the transport conveyor belt 2. Roller 16 is driven in the direction of arrow 26. A lever 15 is mounted on the same bearing as roller 17. This lever 15 carries a thermal resistor 20 for furnishing a signal corresponding to the temperature of tobacco 3. This thermal resistor rests on the upper surface of tobacco 3.

Figure 2:
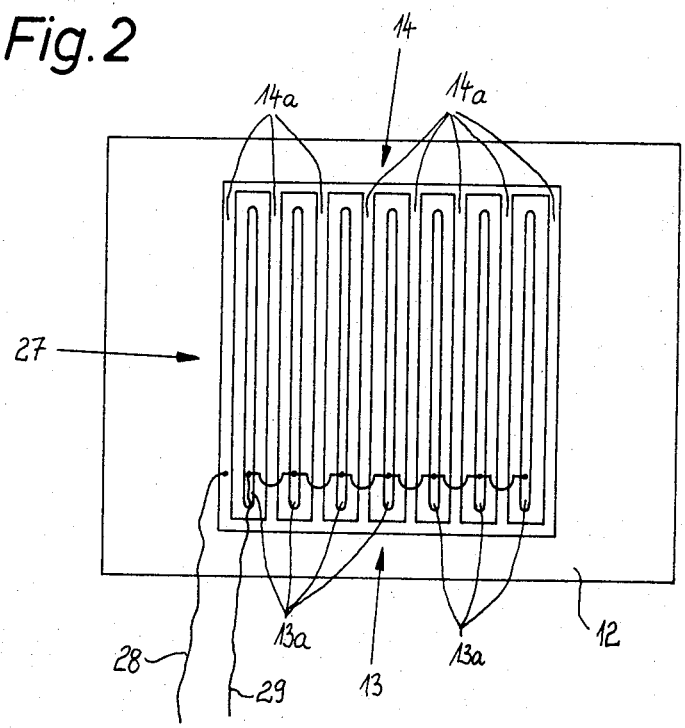
FIG. 2 shows a top bottom view of the electrodes of the arrangement of FIG. 1.

FIG. 2 shows a view of isolating plate 12 with electrodes 13 and 14, taken in the direction of arrow II in FIG. 1.

Electrodes 13 and 14 together constitute a measuring capacitor 27. In the embodiment shown in FIG. 2 the first electrode means 13 and the second electrode means 14 each comprise a plurality of electrode elements, 13a and 14a, respectively. Each electrode 13a is arranged between two consecutive ones of the second electrode element 14a. Each electrode 13a is connected to another electrode 13a, while each electrode 14a is connected to another electrode 14a. Lines 28 and 29 serve to connect the so-constituted measuring capacitor 27 to the circuit arrangement shown in FIG. 4.

Figure 3:
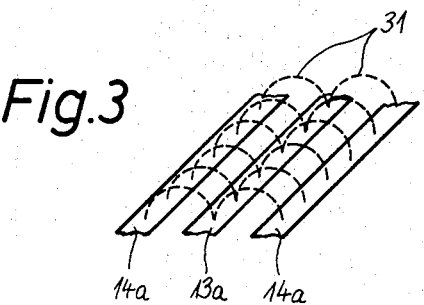
FIG. 3 is a perspective view of some of the electrodes of FIG. 2, including the lines of force of a high-frequency electrical field existing between said electrodes.

FIG. 3 shows the lines of force 31 created by a high-frequency electrical field between the electrode elements 13a and 14a.

The circuit shown in FIG. 2 shows high-frequency oscillator means, here a high-frequency oscillator 32, tuned circuit means 33, measurement circuit means 34, which here comprise an electronic voltage meter, and a temperature-compensating arrangement 36.

The measuring capacitor 27 is shown here only symbolically and is part of the high-frequency tuned circuit 33, as are further capacitors 37, 38, 39 and 41, a coil 42, as well as a tuning capacitor 43 which is driven at a constant speed by means of a motor 44. The high-frequency circuit 33 is connected via coils 46 and 47 and via a capacitor 48 with the high-frequency oscillator 32. The latter comprises in the main a pentode 58, a coil 49 and capacitors 51 and 52. Capacitors 53 and 54 connect a high-frequency rectifier 56 to the high-frequency oscillator. Rectifier 56 rectifies the high-frequency current and applies the same via resistor 57 to the control gate of a pentode 58. The voltage at the anode of pentode 58 is supplied via a resistance 59 to the screen grid of pentode 48. Capacitors 61, 62 and 63 are filter capacitors. Resistors 64, 66, 67 and 68 serve as voltage dividers, while resistor 69 is a load resistance.

The electronic voltmeter used as measurement means in the present invention comprises a second high-frequency rectifier 71, resistances 72 and 73, a capacitor 74 and a pentode 76. An indicator instrument 77 is connected into the anode circuit of pentode 76. The sensitivity of the moisture content measurement can be adjusted via a potentiometer 78. Capacitor 79 is a filter capacitor. In the temperature-compensating means 36, the resistor 81, the potentiometer 82 and resistors 83 and 84 are voltage dividers. The thermal resistor 20 forms a Wheatstone bridge arrangement together with resistors 85, 86, 87 and 88. A resistor 89 is arranged in the diagonal of the Wheatstone bridge. Changes in voltage across resistor 89 are applied to the suppressor grid of pentode 76 in electronic voltmeter 34 via potentiomter 91, 82 and 92 as well as resistors 83 and 93. Resistance 94 is the grid-bias resistor for the screen grid of pentode 76.

Figure 5:
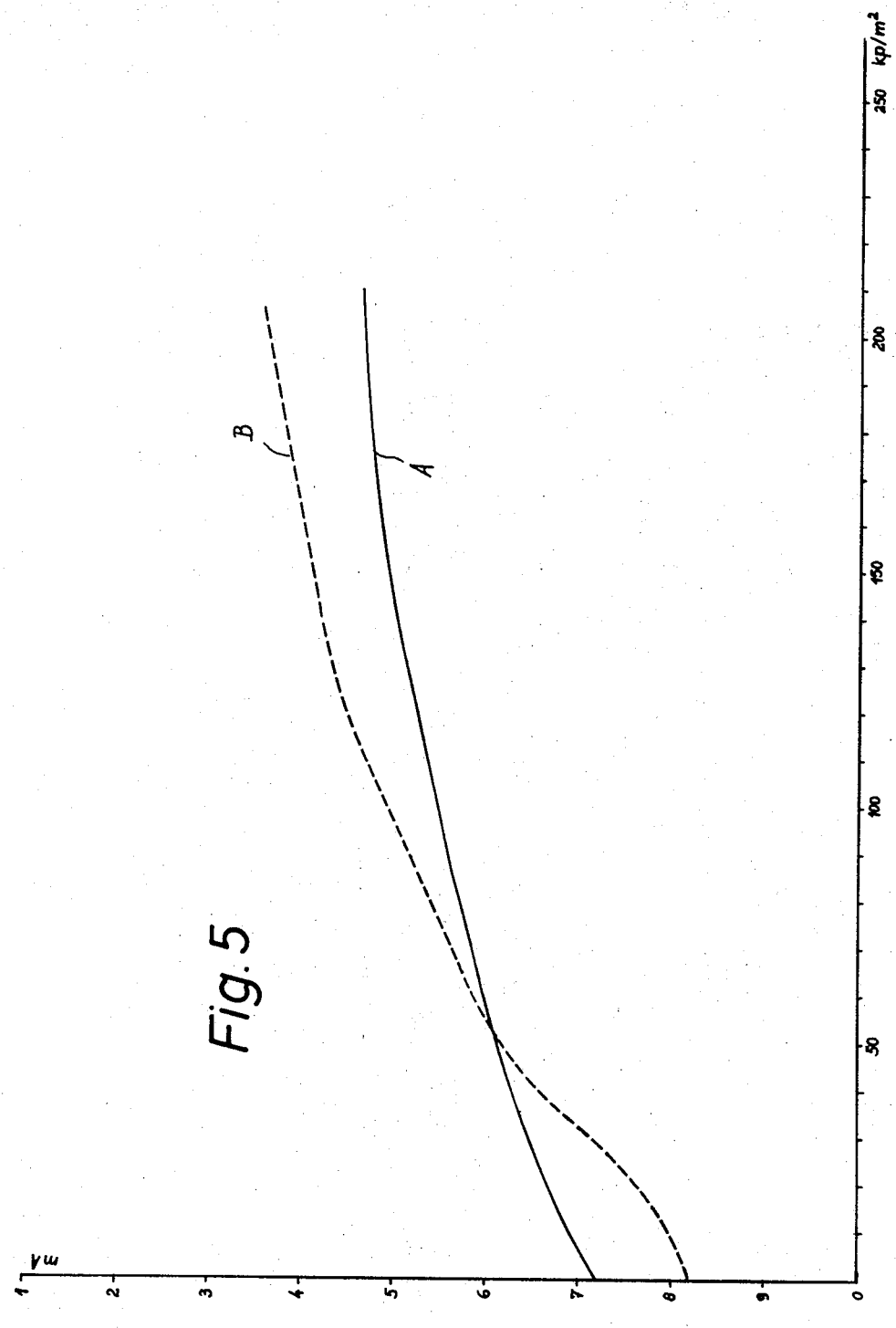
FIG. 5 is a diagram showing the dependence of the measured moisture content on the pressure of the tobacco.

FIG. 5 shows a plurality of measured characteristic curves which demonstrate the dependency of measured moisture content on the pressure exerted on the tobacco whose moisture content is being measured. The abscissa of the diagram is in units of $kp/m^2$, while the measurement signal in milliamps is entered on the ordinate. The characteristic curve A was derived from shredded tobacco having a moisture content of 15.2 percent while characteristic curve B was derived from strips having a moisture content of 16.8 percent.

For both types of tobacco an increase of the measured value with increasing pressure is noted. Thus, it is seen that it is necessary for moisture content measurement to maintain the pressure constant.

The arrangement shown in FIGS. 1–4 operate as follows:

Tobacco is supplied in a continuous stream to conveyor belt 2 by the supply means 6, the level of tobacco 3 on conveyor belt 2 always exceeding the level of the force lines 31 of measuring capacitor 27. Depending upon the height of the layer of tobacco 3 on conveyor 2, the press conveyor 4 is lifted more or less, thus exerting a constant pressure due to its dead weight onto tobacco 3. Since the conveyor means 4 weigh many times the weight of the tobacco situated underneath the same, the change in weight of the tobacco between the press conveyor 4 and the conveyor belt 2 is negligible in so far as the measuring of the moisture content is concerned. The stream of tobacco 3 is thus pushed past the electrodes 13 and 14 of measuring capacitor 27 between the transport conveyor belt 2 and the press conveyor 19.

Figure 4:
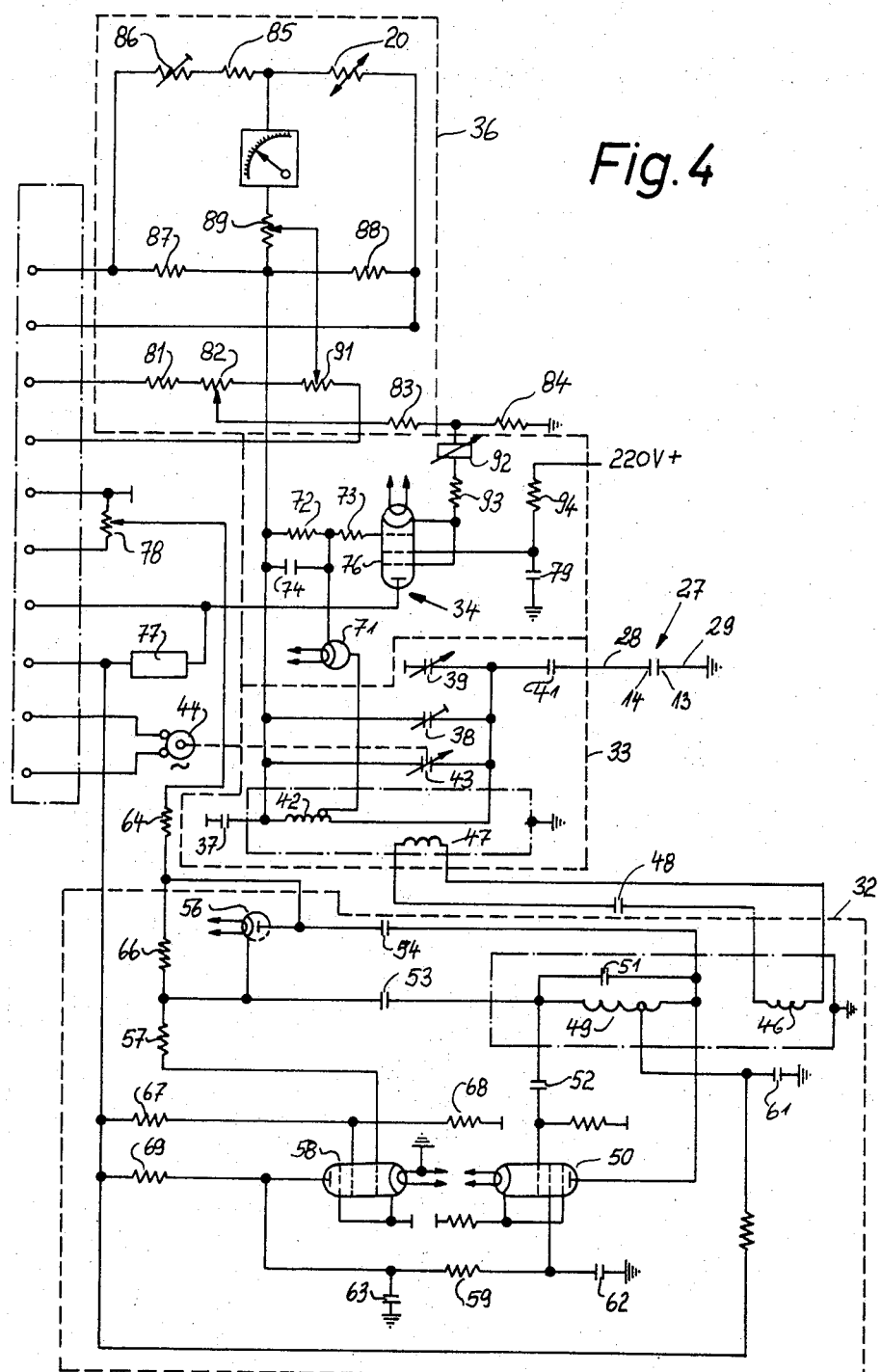
FIG. 4 shows a circuit diagram of the measuring arrangement associated with the electrodes of FIG. 3.

The operation of the circuitry of FIG. 4 is the following:

Reference to FIG. 4 shows that the inherent resonant frequency of the high-frequency tuned circuit 33 depends on the main upon choke coil 42, capacitor 38 and measuring capacitor 27. This inherent resonant frequency is periodically varied by means of tuning capacitor 43 which is driven at a constant speed by motor 44. The frequency of high-frequency oscillator 32 is so chosen that it lies in approximately the middle of the range of the inherent resonant frequency of tuned circuit 33. It should also be noted that high-frequency oscillator 32 is amplitude-stabilized by means of the feedback resulting from the use of rectifier 71. The variation of the inherent resonant frequency of the tuned circuit is so chosen that each turn of the tuning capacitor causes the tuned circuit to be in resonance at least once with the high-frequency oscillator 32. In this way a high-frequency voltage exists at the electrodes 13 and 14 of measuring capacitor 27 and a high-frequency alternating electrical field exists between the electrode elements 13a and 14a. The electronic voltmeter measures voltage peaks which appear when the tuned circuit 33 comes into resonance with the high-frequency oscillator 32. Such voltage peaks are indicated on indicating means 77. The amplitude of these voltage peaks depends on the dielectric losses within the capacitor 27, which in turn depend on the moisture content of the tobacco being transported over electrodes 13 and 14.

Since the indication on the indication means 77 also depends on the temperature at the interior of capacitor 27, that is on the temperature of tobacco 3, the temperature-dependent resistor 20 is supplied. This temperature-dependent resistor 20 is allowed to slip on the surface of tobacco 3 by being held by a lever 15. It is connected to the Wheatstone bridge and serves to create a voltage on resistor 89 which varies with variations in temperature. This voltage variation controls the bias on pentode 17 of electronic voltmeter 34, thereby compensating for measurement errors resulting from temperature variations of tobacco 3.

The measurement signal on indicator means 77 is used in the tobacco-processing industry for controlling tobacco processing such as humidifying the tobacco, drying it, or flavoring the tobacco, among other uses.

Figure 6:
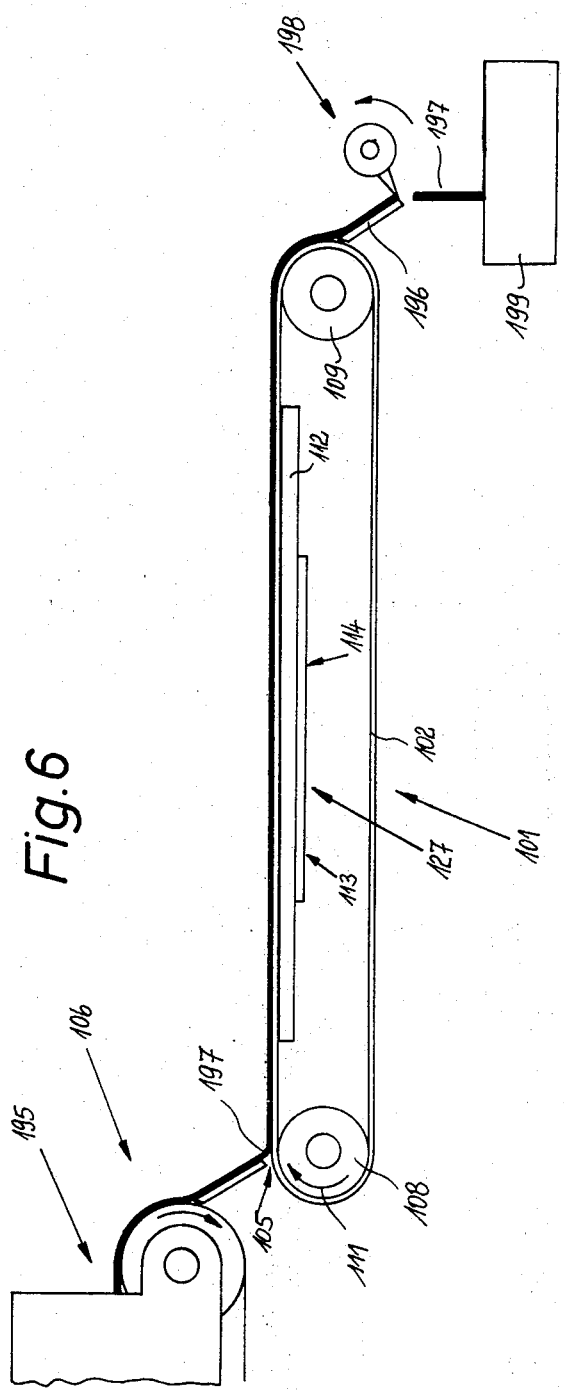
FIG. 6 shows a tobacco drying station including a measuring arrangement according to the present invention.

FIG. 6 shows an overall arrangement for drying tobacco which makes use of the moisture content measuring signal generated by the present invention. Sheet tobacco is supplied to the measuring arrangement of the present invention from a drying station 195. No press conveyor is utilized since the tobacco is in sheets. The dried tobacco thus passes through the measuring station. The means which transported the tobacco away from the measuring station (7, FIG. 1) has been replaced by a skimmer 196 which lifts the sheet tobacco 197 from the conveyor belt 102 and an associated rotating knife 198 which cuts the sheet tobacco into individual pieces which are then collected in a container 199. All other elements shown in FIG. 9 are the same as those in FIG. 1 and have the same reference numerals, but increased by 100. These will not be explained anew.

The measurement signal which is generated in the same fashion as described with reference to FIGS. 1 and 4 can be used for controlling the drying process in drier 195 in such a manner as to keep the moisture content of sheet tobacco 197 constant.

Figure 7:
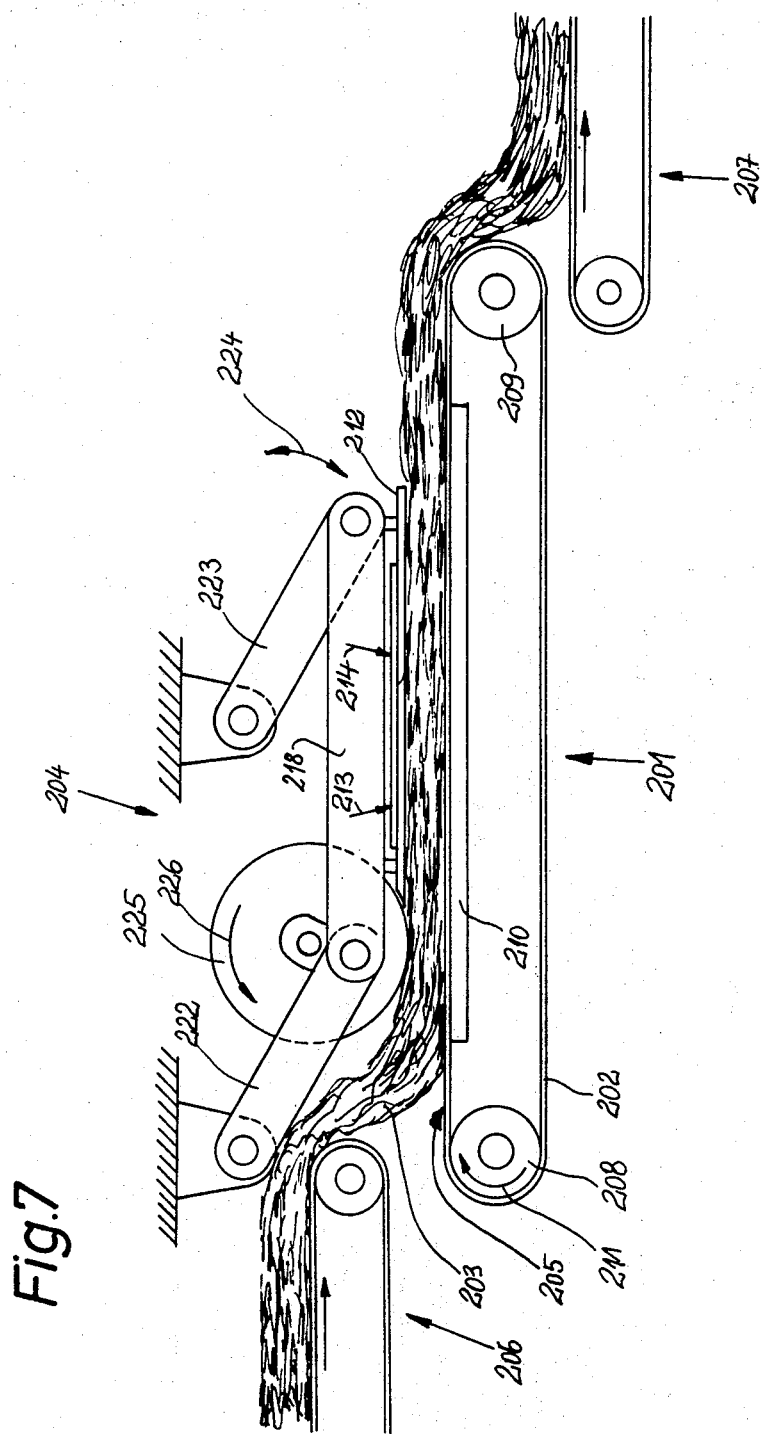
FIG. 7 is a variation of the arrangement of FIG. 1.

FIG. 7 shows a variation of the arrangement of FIG. 1. In FIG. 7 those elements which corresponds to the same elements in FIG. 1 have the same reference numerals, but increased by 200. The operation of these elements will not be explained again.

The main difference between FIGS. 1 and 7 is that in FIG. 7 the pressing means comprises a rotatable drum 225 which is mounted on a link 22, as well as an isolating plate 212 which is arranged following the drum in the direction of transport of the tobacco and carries the electrode 213 and 214. The isolating plate 212 is mounted on the carrier means 218. In order to absorb the pressure exerted by drum 225, the conveyor belt 202 passes over a reinforcing plate 210.

The operation of the arrangement of FIG. 7 corresponds in the main to that of FIG. 1, the only change being in the pressing means 204 as mentioned above. In FIG. 7 the tobacco 203 is compressed by drum 225, and then is transported under the isolating plate 212 where it is maintained in the compressed condition and passes by the electrodes 213 and 214.

The advantage of the present invention resides in the particular arrangement of the electrodes of the measuring capacitor, since this arrangement results in a linear moisture content versus electrical measurement value within the range of interest to the tobacco industry. This results in a more exact measurement of the moisture content which of course is particularly desirable for the regulation of tobacco processes. The pressing of the tobacco in the measurement station results in a lack of dependence of the moisture content measuring signal on the mass of tobacco and further allows different types of tobacco to be subjected to a moisture content measurement.

Without further analysis, the foregoing will so fully reveal the gist of the present invention that others can by applying current knowledge readily adapt it for various applications without omitting features which, from the standpoint of prior art, fairly constitute essential characteristics of the present invention and, therefore, such features and modifications should and are intended to be comprehended within the meaning and range of equivalence of the following claims.

What is claimed as new and desired to be secured by Letters Patent is set forth in the appended claims:

1. Method for generating a measurement signal indicative of the moisture content of a predetermined quantity of smoking goods at a measuring station, said smoking goods having a measuring surface, comprising, in combination, the steps of creating a high-frequency electrical field at said measuring station, said high-frequency electrical field having lines of force entering and leaving said smoking goods through said measuring surface; pressing said predetermined quantity of tobacco with a force substantially exceeding the weight thereof; and monitoring said high-frequency electrical field to derive therefrom an electrical signal having a characteristic varying as a function of said moisture content, said electrical signal constituting said measurement signal.

2. A method as set forth in claim 1; further comprising the step of transporting said smoking goods in a continuous stream past said measuring station.

3. Arrangement for furnishing a measurement signal indicative of the quantity of moisture in a predetermined quantity of smoking goods at a measurement station, comprising in combination, support means supporting said smoking goods at said measuring station, said support means creating a first surface in said smoking goods, said smoking goods further having a second surface opposite said first surface; high-frequency oscillator means for creating a high-frequency electrical signal; tuned circuit means connected to said high-frequency oscillator means for creating a high-frequency electrical field having lines of force in response to said high-frequency electrical signal, said tuned circuit means comprising first and second electrode means for directing said lines of force into and out of said smoking goods through a selected one of said first and second surfaces; pressing means for pressing said smoking goods against said support means with a predetermined force; frequency control means connected to said tuned circuit means for controlling the resonant frequency of said tuned circuit means in such a manner that said tuned circuit means is in resonance with said high-frequency electrical signal; and measurement circuit means connected to said tuned circuit means for furnishing an electrical signal during said resonance, said electrical signal having a characteristic varying as a function of said moisture content of said smoking goods.

4. An arrangement as set forth in claim 3, wherein said first electrode means comprise a plurality of interconnected first electrode elements for guiding said lines of force into said smoking goods, and wherein said second electrode means comprise second electrode means for guiding said lines of flux out of said smoking goods.

5. An arrangement as set forth in claim 4, wherein said plurality of first electrode elements is arranged in one plane with said second electrode means.

6. An arrangement as set forth in claim 5, wherein said second electrode means comprise a plurality of interconnected second electrode elements.

7. An arrangement as set forth in claim 6, wherein said plurality of first electrode elements is arranged in a sequence in a given plane; and wherein each of said second electrode elements is arranged adjacent to a corresponding one of said first elements in said plane.

8. An arrangement as set forth in claim 3, wherein said support means comprise endless belt conveyor means.

9. An arrangement as defined in claim 8, wherein said support means further comprise isolating plate means supporting said endless belt conveyor means.

10. An arrangement as set forth in claim 3, wherein said pressing means comprise carrier means; roller means mounted on said carrier means; reinforcing plate means connected to said carrier means; conveyor belt means passing over said roller means and said reinforcing plate means.

11. An arrangement as defined in claim 10; further comprising transport means transporting said smoking goods past said measuring station; and wherein said pressing means comprises drum means pressing said smoking goods; and spaced plate means following said drum means in the direction of transport of said smoking goods, for maintaining said smoking goods in said pressed condition.

12. An arrangement as set forth in claim 4, wherein said frequency-varying means comprises frequency-varying means for periodically varying the resonant frequency of said tuned circuit means over a predetermined frequency range.

13. An arrangement as defined in claim 12, wherein said predetermined frequency range includes the frequency of said high-frequency electrical signal furnished by said high-frequency oscillator means.

14. Arrangement for furnishing a measurement signal indicative of the quantity of moisture in a predetermined quantity of smoking goods at a measurement station, comprising in combination, support means supporting said smoking goods at said measuring station, said support means creating a first surface in said smoking goods, said smoking goods further having a second surface opposite said first surface; high-frequency oscillator means for creating a high-frequency electrical signal; tuned circuit means connected to said high-frequency oscillator means for creating a high-frequency electrical field having lines of force in response to said high-frequency electrical signal, said tuned circuit means comprising first and second electrode means for directing said lines of force into and out of said smoking goods through a selected one of said first and second surfaces; frequency control means connected to said tuned circuit means for controlling the resonant frequency of said tuned circuit means in such a manner that said tuned circuit means is in resonance with said high-frequency electrical signal; and measurement circuit means connected to said tuned circuit means for furnishing an electrical signal during said resonance, said electrical signal having a characteristic varying as a function of said moisture content of said smoking goods.

15. An arrangement as set forth in claim 14, further comprising temperature-compensating circuit means connected to said measurement circuit means.

16. An arrangement as set forth in claim 15, wherein said temperature-compensating circuit means comprise a Wheatstone bridge circuit.

* * * * *